Nov. 12, 1940.     W. B. WARD     2,221,335
INDICATING BULLETIN BOARD
Filed April 17, 1939     2 Sheets-Sheet 2
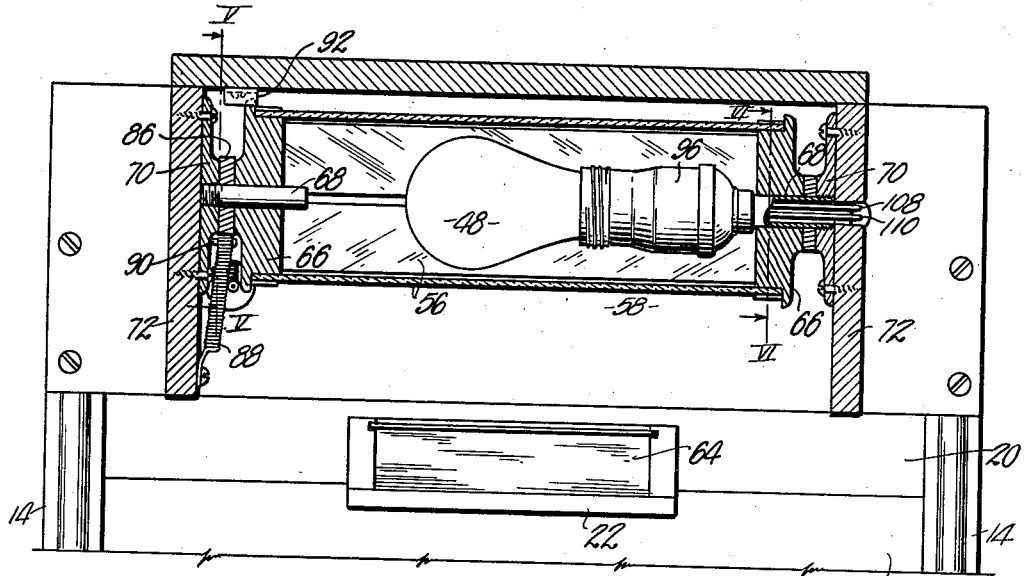
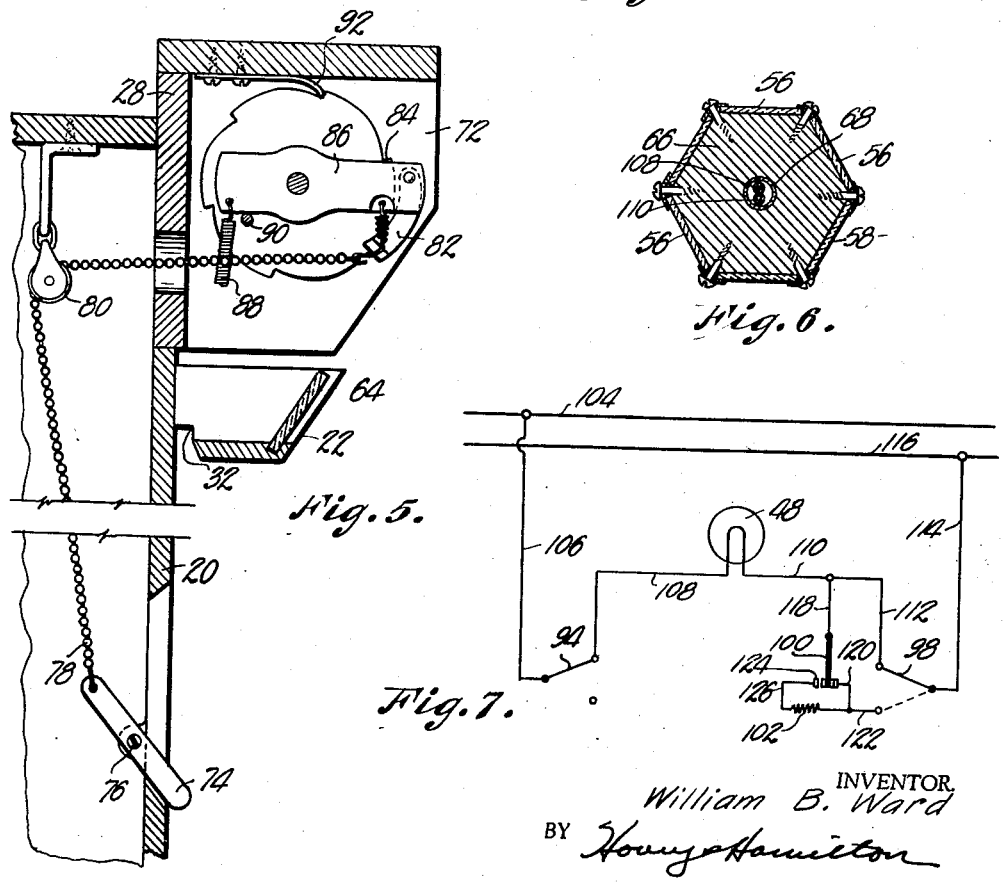
INVENTOR,
William B. Ward
BY Howys Hamilton
ATTORNEYS Patented Nov. 12, 1940

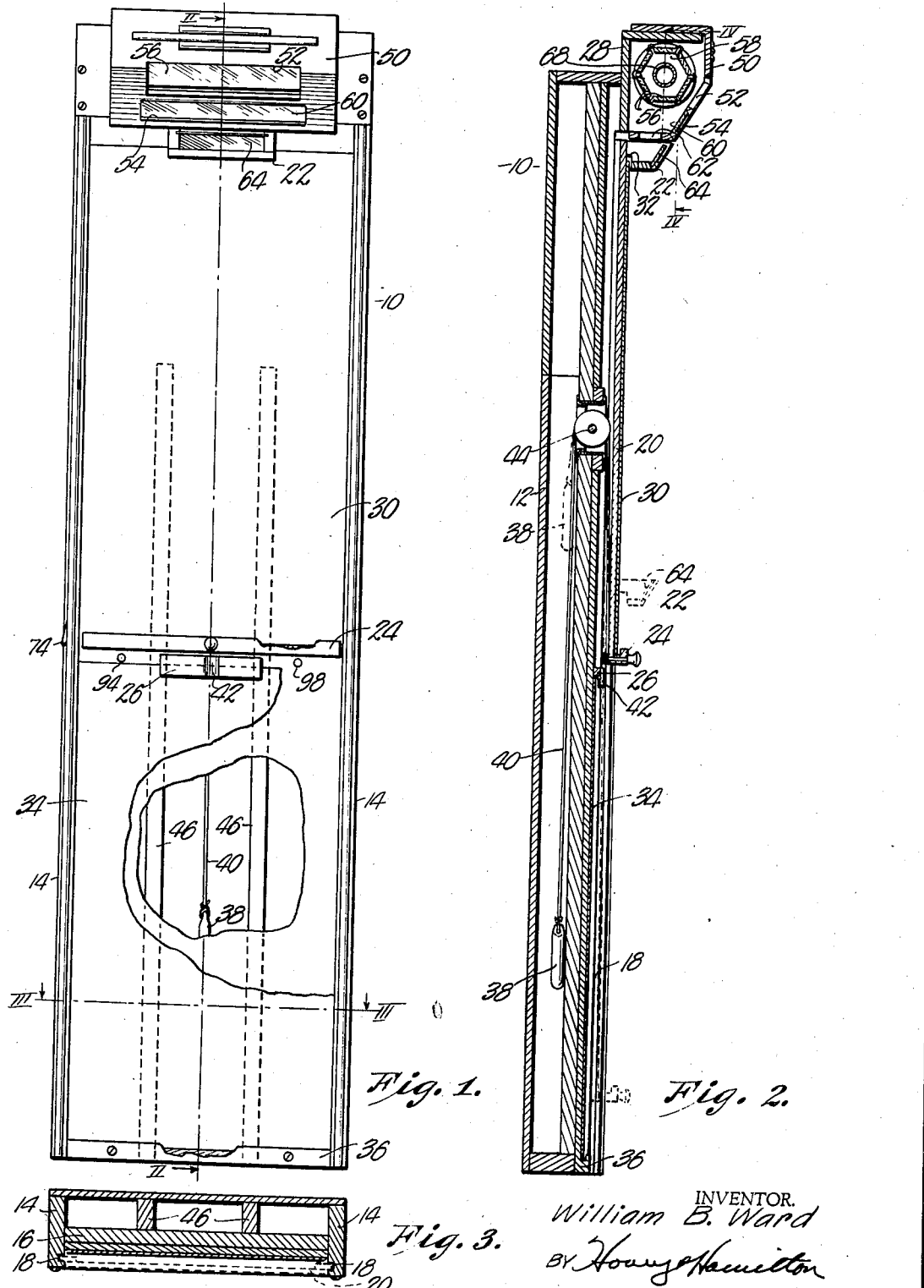

2,221,335

UNITED STATES PATENT OFFICE 2,221,335

INDICATING BULLETIN BOARD

William B. Ward, Kansas City, Mo.

Application April 17, 1939, Serial No. 268,175

3 Claims. (Cl. 40—130)

This invention relates to bulletin boards in the nature of those adapted to convey information to a group of observers, which information must be quickly and accurately altered from time to time, and the primary object is to provide such a board having unique means for embodying all of the contemplated features, one form of each of which is more specifically hereinafter set down.

One of the important aims of this invention is the provision of a bulletin board unit, several of which may be combined to meet the requirements of a particular user and each of which has as a part thereof a manually controlled head for displaying indicia of a predetermined character; a movable plate provided with structure for releasably holding a bulletin sheet; means for yieldably maintaining the said plate at one end of the case forming the board of the unit and adjacent to the aforesaid head; and elements at the other end of the case for supporting an additional bulletin sheet so that it will be quickly available for association with the movable plate at the time desired.

A yet further object of the present invention is the provision of an indicating bulletin board of the aforementioned character having as a part thereof, a single, electric lamp disposed within the head of the bulletin board and arranged in a manner so as to effectively illuminate a plurality of transparent panels, upon which panels appear indicia having a definite relation to the matter contained on the bulletin sheet displayed by the board immediately beneath the illuminated head thereof.

A large number of minor objects, including specific details of construction and manner of using the bulletin board unit, will appear during the course of the following specification, referring to the accompanying drawings wherein:

Figure 1 is a front elevational view of an indicating bulletin board unit made in accordance with the present invention.

Fig. 2 is a longitudinal vertical central sectional view through the unit taken on line II—II of Fig. 1.

Fig. 3 is a cross sectional view through the unit taken on line III—III of Fig. 1.

Fig. 4 is an enlarged fragmentary sectional view taken on line IV—IV of Fig. 2, a portion of the head being removed.

Fig. 5 is an enlarged fragmentary detailed sectional view taken on line V—V of Fig. 4.

Fig. 6 is a similar view taken on line VI—VI of Fig. 4; and,

Fig. 7 is a wiring diagram illustrating the manner of energizing the electric lamp.

A bulletin board made, as exemplified by the illustrated embodiment herewith, is particularly useful in reporting information to spectators, which originates at a horse racing track, and the accuracy and dispatch must be as free as possible from inaccuracies due to the human element.

In actual use a bulletin board to be complete may comprise a large number of units placed in side by side relation, each unit being independently manipulated by the operator and each being individual to a horse racing track, information from which is transmitted by wire to the operator of the bulletin board and converted by him into intelligible indicia appearing on the various parts of the structure.

Referring particularly to one manner of making the bulletin board unit, a hollow case 10 has a back wall 12, side walls 14, and a front wall 20 16, the position of which is such as regards side walls 14 as to expose outwardly extending portions having grooves 18 formed therein. Grooves 18 formed in opposed inner faces of side walls 14 extend substantially the entire length of case 10 and slidably carry plate 20 whereupon is mounted fixture 22, and strip 24.

The front of case 10 is divided into an upper zone and a lower zone, the line of demarkation between which zones is defined by grooved block 26 mounted on front wall 16. The length of plate 20 is substantially the same as each of the two zones, and when in the position shown in Fig. 2, its upper end and fixture 22 is adjacent to hollow head 28 carried by case 10.

A bulletin sheet 30 is held against the outer surface of plate 20 when the lower edge thereof is within the groove of strip 24, while its upper edge rests in notches 32 formed in the ends of bracket 22. The face of this bulletin sheet 30 will have printed thereon the names and numbers of the entries and a space is usually provided for receiving the notation of the operator indicating the order of finish.

Another bulletin sheet 34 is prepared for use on plate 20 when it is in the operative position directly beneath head 28 and at the upper end of case 10. This second mentioned bulletin sheet 34 lies against the outer face of front wall 16 and the upper and lower ends thereof are respectively in notches formed by block 26 and sill 36.

Means for yieldably maintaining plate 20 at one end of its path of travel in grooves 18 is here shown to be in the nature of a counter weight 38 and cable 40, to one end of which the counter weight is attached, while the other end of cable 40 is secured to the back of plate 20 adjacent to the lower end thereof. A notch 42 formed in block 26 provides clearance for the passage of cable 40 as plate 20 is reciprocated and a pulley 44 mounted in an opening formed through front wall 16 receives cable 40.

Guide strips 46, in the nature of longitudinal partitions within the case 10, confine weight 38 therebetween and preclude objectionable swinging during the operation. Weight 38 is heavy enough to counter balance the weight of plate 20 and all associated parts so that when the bulletin board is in use, the operator exerts a minimum amount of energy in drawing plate 20 to a lowered position where bulletin sheet 30 may be replaced or marked.

Hollow head 28 of each unit is specially formed so that a single lamp 48 serves to illuminate a number of panels upon which desired indicia has been placed. Head 28 has a removable cover 50 through the front inclined wall of which is formed a window 52 and an opening 54. Window 52 is left unobstructed so that any one of the plurality of panels 56, constituting drum 58, may be seen and opening 54 has a transparent sheet 60 thereover upon which the name of the race track is marked in opaque letters.

The lower wall of cover 50 has a hole 62 formed therethrough which lies directly over fixture 22, the front of which comprises a transparent sheet of material 64 whereupon is marked the condition of the track being reported and upon which the horses designated on the face of the bulletin 30 are running. Sheet 64 is quickly replacable because the upper side of fixture 22 is open for the purpose of registering with opening 62 formed in the bottom of cover 50. Such disposition of parts insures that light from lamp 48 will illuminate sheet 64 as well as transparent panels 56 of drum 58. Fixture 22 travels with plate 20 and when said plate is in the lowered position, the manipulation of sheet 64 to the extent of replacement, is convenient and quickly accomplished.

The plurality of panels 56 which are arranged in a circumscribing path around lamp 48, are mounted upon heads 66 rotatably journalled upon pintles 68 carried by plates 70 that are mounted upon the ends 72 of head 28. Each panel 56 has printed thereon, one of a number of words, for conveying a message. It has been found desirable to mark respective panels with the following indicia: 1—Coming out; 2—At the post; 3—They're off; 4—Photo finish; 5—Official; and 6—Not official. As information is conveyed to the operator of the bulletin board, drum 58 is turned about the axis of pintles 68 to position the desired panel 56 behind window 52.

Drum 58 is operated through the medium of a conveniently located lever 74, one end of which is within easy reach of the operator. Lever 74 is pivotally mounted as at 76 and the other end thereof is joined to a flexible chain or cable 78, which passes over pulley 80 and joins dog 82, as illustrated in Fig. 5. Dog 82 is yieldably maintained in engagement with one of a number of shoulders 84 formed on the annular periphery of head 66. Dog 82 is carried by rocker arm 86, freely mounted upon pintle 68.

A spring 88 yieldably maintains rocker arm 86 against stop 90 that extends outwardly adjacent bearing plate 70. A leaf spring 92 has one end in frictional engagement with the periphery of head 66 so as to preclude accidental movement in a direction opposite to that desired and opposite to that direction of travel through which dog 82 forces the drum when in normal operation. Oscillating lever 74 about pivotal connection 76 will impart step by step rotary motion to drum 58.

Lamp 48 is controlled by switch 94 and the wires supplying energy thereto extend into socket 96 through hollow pintle 68 about which the drum rotates. Another switch 98 may be manipulated to cause lamp 48 to alternately burn bright and dim, thus when it is desired to attract attention to one unit of the bulletin board, switch 98 may be turned to operatively include the thermostatic control 100 for the purpose of periodically cutting into the circuit resistance 102. As the circuit is shown in Fig. 7, current is supplied from line 104 through wire 106, switch 94, and wire 108 to lamp 48. Wires 110 and 112 extend from lamp 48 to switch 98 and wire 114 completes the circuit back to the other side of the main source of supply 116.

When switch 98 is moved to the position shown in dotted lines (Fig. 7), the circuit from lamp 48 is completed back to line 116 through wire 110, wire 118, bi-metallic thermostat 100, wire 120, wire 122, switch 98, and wire 114. When thermostat 100 is in the position just described, the lamp will brightly burn, but when thermostat 100 flexes to move into engagement with contact 124, on wire 126, resistance 102 will form a part of the circuit and therefore dim the lamp 48. Movement of thermostat 100 controls the periodic dimming of the lamp.

It is understood that a large number of modifications might be made in constructing a bulletin board in accordance with the present invention without departing from the spirit thereof and scope of the appended claims.

Having thus described the invention, what is claimed as new and desired to be secured by Letters Patent is:

1. A bulletin board of the character described, comprising a case; a hollow head, provided with a pair of openings, carried at the upper end thereof; a transparent panel having indicia thereon over one of said openings; a lamp in the head to render the indicia visible and to direct rays of light through the other of said openings; a plate mounted on the case for movement toward and from the head; a fixture on the plate having an open side and a transparent panel forming another side thereof; a sill on the plate in spaced relation to the fixtures; and a bulletin sheet on the panel, said bulletin sheet having indicia thereon pertaining to the indicia on the transparent panel over one of the openings of the hollow head, said transparent panel having indicia thereon pertaining to indicia on said bulletin sheet, said transparent panel of the fixture being illuminated by light entering the open side of the fixture through the open side of the head when the plate is at the end of its path of travel close to the head.

2. A bulletin board of the character described, comprising a case; a hollow head, provided with a pair of openings, carried at the upper end thereof; a transparent panel having indicia thereon over one of said openings; a lamp in the head to render the indicia visible and to direct rays of light through the other of said openings; a plate mounted on the case for movement toward and from the head; a fixture on the plate having an open side and a transparent panel forming another side thereof; a sill on the plate in spaced relation to the fixture; and a bulletin sheet on the panel, said bulletin sheet having indicia thereon pertaining to the indicia on the transparent panel over one of the openings of the hollow head, said transparent panel having indicia thereon pertaining to the indicia on said bulletin sheet, said transparent panel of the fixture being illuminated by light entering the open side of the fixture through the open side of the head when the plate is at the end of its path of travel close to the head, said sill and said fixture having notches provided therein for the reception of the bulletin sheet to hold the latter in place.

3. A bulletin board of the character described comprising a case; a hollow head provided with a pair of openings, carried at the upper end thereof; a plurality of transparent panels having indicia thereon selectively positionable respectively over one of the openings; a lamp in the head to render the indicia visible through said one opening and to direct light rays through the other of said openings of the pair; a plate mounted on the case for movement toward and from the head; and a fixture on the plate having an open side and a transparent panel forming another side thereof, said open side of the fixture and the hollow head being in communication whereby they illuminate the transparent panel of the fixture when the open side of the fixture and one of the openings of the head are in register.

WILLIAM B. WARD.